United States Patent [19]
Fondelius

[11] Patent Number: 6,053,500
[45] Date of Patent: *Apr. 25, 2000

[54] SEAL HOUSING

[75] Inventor: Johan Fondelius, Stockholm, Sweden

[73] Assignee: ITT Flygt AB, Solna, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,829

[22] Filed: Oct. 3, 1996

[30] Foreign Application Priority Data

May 15, 1996 [SE] Sweden ................... 9601866

[51] Int. Cl.[7] .............................. F16J 15/34; F16J 15/54
[52] U.S. Cl. .......................................... 277/408; 277/430
[58] Field of Search ...................... 415/170.1; 277/423, 277/430, 408

[56] References Cited

U.S. PATENT DOCUMENTS

| | | | |
|---|---|---|---|
| 1,826,057 | 10/1931 | Dobbins | 277/134 |
| 2,329,990 | 9/1943 | Hornschuch | 277/134 |
| 3,004,782 | 10/1961 | Meermans | 277/134 |
| 3,076,412 | 2/1963 | Harker et al. | 103/111 |
| 3,558,238 | 1/1971 | Van Herpt | 415/169 |
| 3,693,985 | 9/1972 | Dillner | 277/29 |
| 3,940,150 | 2/1976 | Martin et al. | 277/22 |
| 4,795,167 | 1/1989 | Otsuka | 277/25 |
| 5,195,867 | 3/1993 | Stirling | 415/111 |
| 5,336,048 | 8/1994 | Ganzon et al. | 415/175 |

FOREIGN PATENT DOCUMENTS 2139299  4/1983  United Kingdom ................. 277/203

OTHER PUBLICATIONS

*Seals & Sealing Handbook*, Gulf Publishing Co., Houston, 1981, p. 285.

*Primary Examiner*—Anthony Knight
*Assistant Examiner*—John L. Beres
*Attorney, Agent, or Firm*—Menotti J. Lombardi

[57] ABSTRACT

The invention concerns a seal housing for a mechanical seal device. The seal device is arranged within a cavity (6) provided with a spiral notch (11) at its mantle surface for feeding particles in the liquid in a direction away from the seal means (7) and toward an impeller. The spiral notch opening axially toward the impeller.

9 Claims, 3 Drawing Sheets

SEAL HOUSING

BACKGROUND OF THE INVENTION

This invention pertains to seal housings, for use in rotary machines such as pumps or liquid mixers, and the like, and in particular to seal housings for mechanical face seals arranged between the hydraulic components of the machine and the driving motor therefor, as is typical in pumps of the centrifugal type.

A conventional centrifugal pump comprises a driving unit, such as an electric motor, and a pump housing connected via a driving shaft. In order to prevent the pumped medium from entering the electric motor via the shaft, and cause damage, some sort of seal is arranged between the pump housing and the motor. A typical seal is the so-called mechanical face seal which consists of a rotary seal ring and a stationary seal ring which are pressed towards each other by a biasing force.

Seals of the aforesaid type are very effective, providing that the two seal surfaces are even and undamaged. In order to effect a perfect sealing, there is often used an arrangement consisting of two mechanical seals with an intermediate, intervening oil chamber. In this way, one of the seals will always be lubricated and cooled by clean oil, and the risk of damage is greatly reduced. Of the two seals, the one which faces the pump housing, here called the lower seal, will always be exposed to the pumped medium, and damage can result if the pumped medium contains abrasive particulate. The latter is a circumstance which is common in mines and certain other industrial areas.

The lower seal is normally mounted in a cavity which has a cylindrical or conical form. If conical, the portion with the greater diameter confronts the pump housing. The conical form has manufacturing purposes, but the shape is also used on the theory that particles, which enter the cavity, will be thrown out again by centrifugal force. In fact, however, pollutions in the form of particles having higher density than water are concentrated at the inner part of the cavity where they may damage the seal surfaces as well as the cavity wall. This phenomenon also occurs in seal housings where the cavity has a cylindrical-formed shape.

Concentration of pollutants proceeds from the fact that rotation of the pumped medium generates secondary flows of such a nature that rotating surfaces induce a radially outwards-directed flow, while stationary surfaces induce a radially inwards-directed flow. Particles within the seal housing will be thrown outwards to the cylindrical or conical wall surface by centrifugal force, the boundary layer flow along the wall surface then directing the particles within the housing toward the seal.

The particles are not transported back to the pump impeller, at the outlet of the seal housing, as the backwards-directed flow is weaker than the inwards-directed flow, and because of the fact that the centrifugal force again throws the particles towards the inwards-directed boundary layer flow. The result is that particles which once have entered the seal housing will never leave it, but are concentrated in the inner part of the housing where they cause wear of the housing and the seal.

In order to diminish the risk of wear of the seal ring surfaces and the seal housing, there have been prior art attempts to change the flow pattern in the seal area. An example thereof is shown in U.S. Pat. No. 4,872,690, where an additional means is mounted which turns the flow and thus sometimes solves the problem.

Another solution is shown in U.S. Pat. No. 5,513,856 wherein a spiral formed land in the seal cavity makes the particles move in a direction away from the seal. The boundary layer flow still tries to bring the particles inwards and toward the seal, but the land helps the centrifugal force to bring the particles out of the boundary layer flow and keep them within the land.

The instant invention is a further development of the last mentioned solution in which the wall of the seal housing is configured in a more effective arrangement.

SUMMARY OF THE INVENTION

According to the broader aspects of this invention, an improved seal housing is provided for a rotary machine, such as a pump or mixer for liquids, which comprises a driving motor, a hydraulic part with a rotary impeller connected to the motor via a shaft, and a mechanical face seal arranged within a cavity, in said seal housing, which cavity has an annular wall surface with means on said annular wall surface defining a helical notch with a slope to a bottom, said means being cooperative in response to rotation of said shaft for directing abrasive particles from said cavity toward said impeller.

Another object of this invention is to disclose a shaft seal housing, for a rotary machine which has a fluid-working impeller, comprising a body, centrally-bored for journalling an impeller-driving shaft therein; wherein said body has a cavity, formed therein, which openly confronts said impeller; said cavity has an annular wall surface; and said wall surface has a shoulder with a channel formed bottom which is cooperative in response to rotation of said shaft, for directing abrasive particles from said cavity toward said impeller.

Further objects of this invention, as well as the novel features thereof, will become apparent by reference to the following description, taken in conjunction with the accompanying figures.

DETAILED DESCRIPTION OF THE PREFERRED EMBODIMENTS

Figure 1:
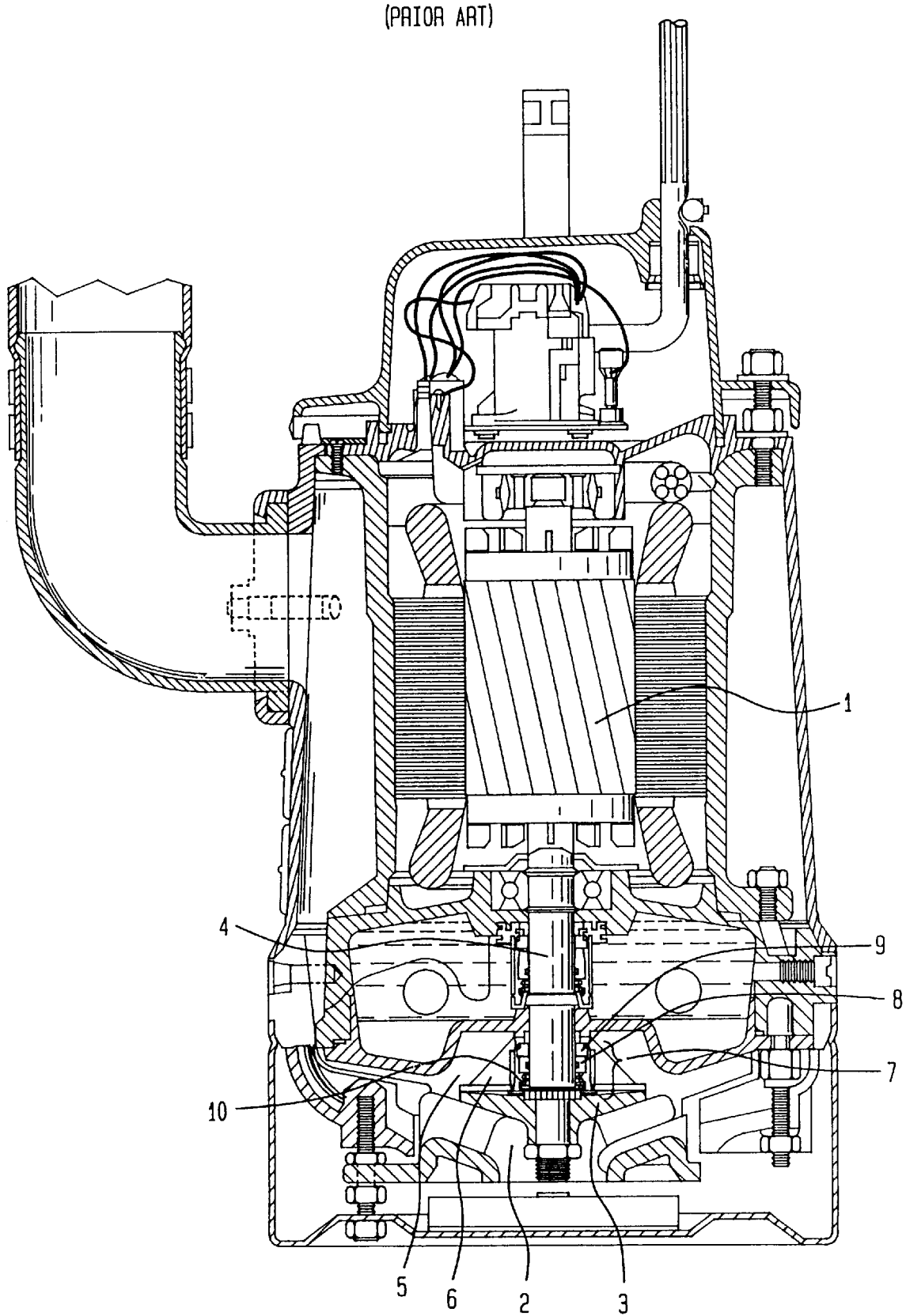
FIG. 1 is an axially-taken cross-sectional view through a prior art centrifugal pump having a typical seal housing therein.

In FIG. 1, the pump has an electric motor driving unit 1, a hydraulic unit 2, with a pump impeller 3 connected to the driving unit 1 by a shaft 4. The seal housing 5 has a cavity 6 formed therein which confronts the impeller 3. Within the cavity 6, and about the shaft 4, is a mechanical face seal 7, the latter comprising a rotary sealing element 8, a stationary sealing element 9, and a compression spring 10 urging the two elements into engagement.

Figure 2:
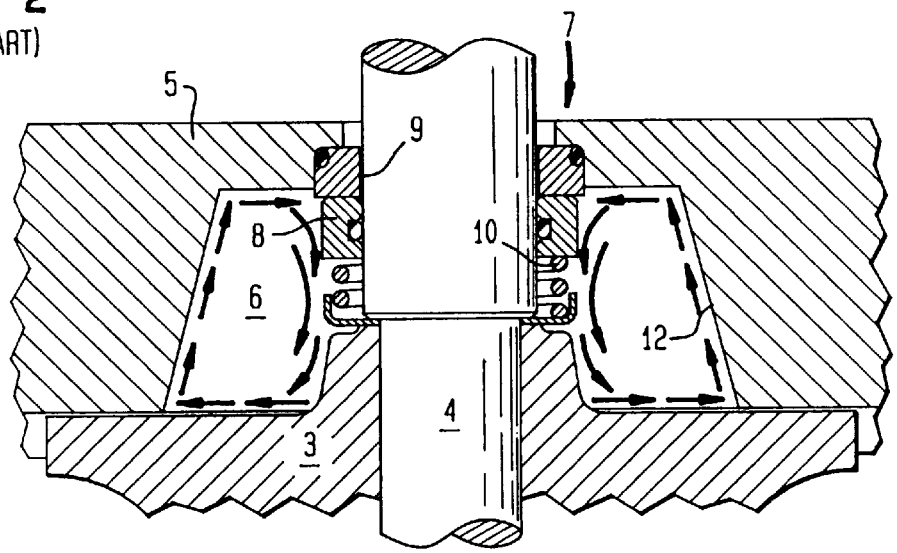
FIG. 2 depicts a prior art seal housing, confronting an impeller, in which the common secondary flow patterns are shown.

The aforesaid seal housing 5, cavity 6, seal 7 and shaft 4 are shown in greater detail and in enlargement in FIG. 2. The captive flows of liquid, within the cavity 6, are shown in FIG. 2 by the arrows. The liquid flows in loops in the cavity 6 which means that abrasive particulate stays within the cavity. Consequently, damaging wear subsequently occurs.

Figure 3:
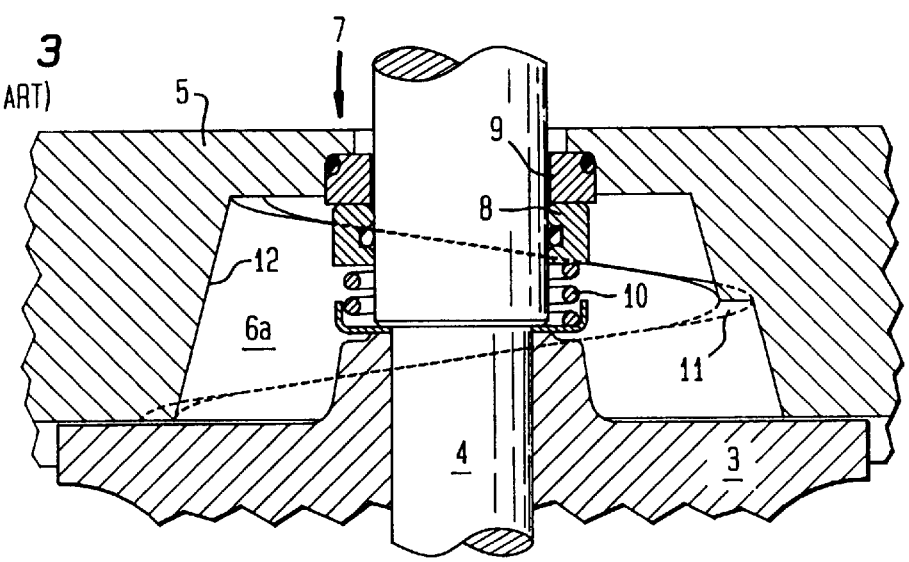
FIG. 3 is an illustration, like that of FIG. 2, in which an embodiment of the prior art is shown.

FIG. 3 depicts an embodiment of the prior art in which the cavity 6a has a flat helical land 11 formed in the annular wall surface 12 thereof. Now, particles that have entered the cavity 6a are transported by the boundary layer flows towards the inner part, bottom, of the cavity 6a. By this type design of the land 11, such migration of the particles is prevented by centrifugal force. Instead, the particles will be caught by the land 11 and follow it, helically, out of the cavity 6a towards the impeller 3.

Figure 4:
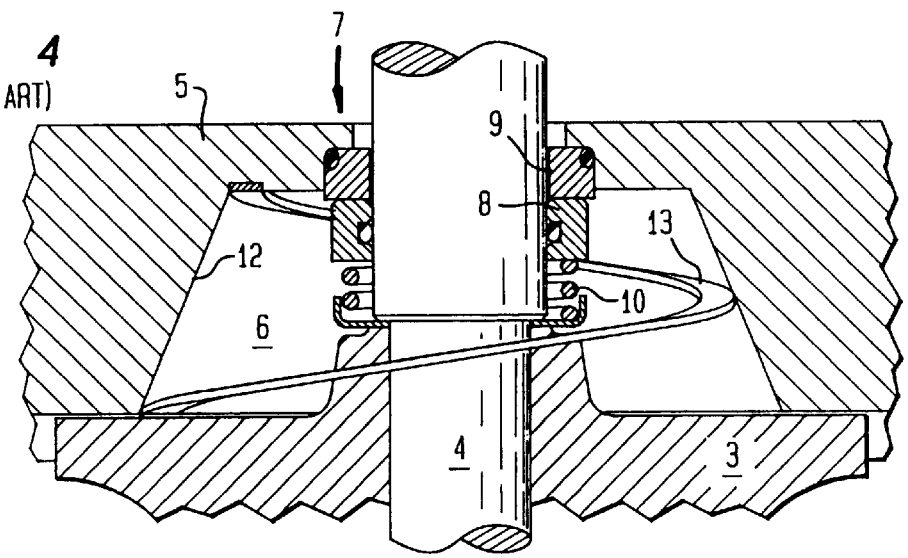
FIG. 4 is a view like that of FIG. 2 of another embodiment of the prior art.

In FIG. 4 another embodiment of the prior art is shown where, in lieu of a land 11 being formed in the annular wall surface 12 of the cavity 6, a helical insert 13 is set within the cavity 6 and in engagement with the wall surface 12.

Figure 5:
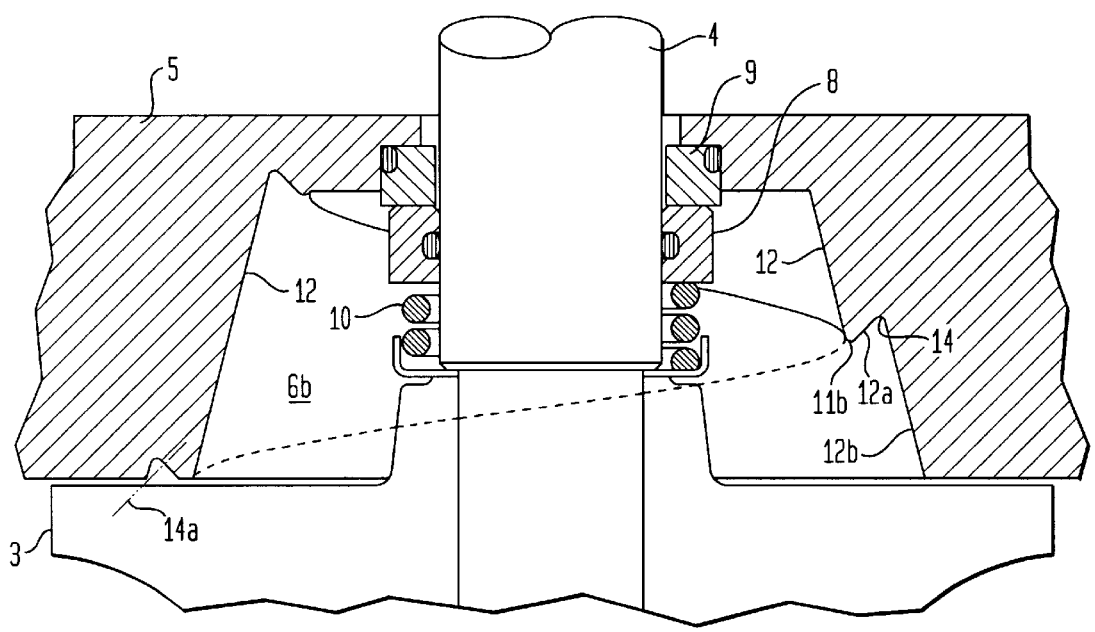
FIG. 5 is a view like that of FIG. 2 in which an embodiment of the invention is shown.

FIG. 5 shows an embodiment of the invention. The cavity 6b has a notch or shoulder 11b formed in the wall 12 and the notch has a winding direction towards the pump impeller 3 as seen in the rotational direction of the impeller. The notch or shoulder 11b slopes downward away from the impeller to a bottom 14 and forms a wall portion 12a. Said wall portion 12a being so directed that the perpendicular axis 14a of the wall portion is directed radially outwards with reference to the rotation axis and towards the impeller in at least one portion of the notch. By this type of design, with the notch or shoulder 11b, even migration of small particles into the seals is prevented by centrifugal force. The particles, including small ones, will be carried by the notch and follow it, helically out of cavity 6b towards the impeller where the particles will be expelled through the slot between the impeller 3 and seal housing 5.

Figure 6:
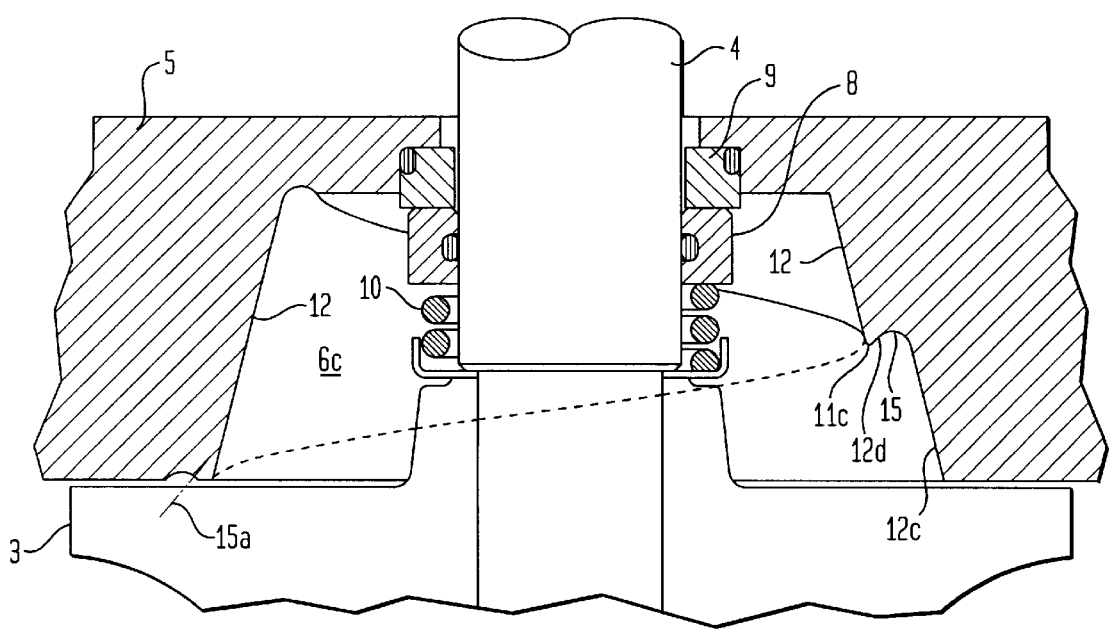
FIG. 6 is a view like that of FIG. 2 in which another embodiment of the invention is shown.

FIG. 6 shows another embodiment of the invention. The cavity 6c has a notch or shoulder 11c formed in the wall 12 and the notch has a winding direction toward the pump impeller as seen in the rotational direction of the impeller. The notch or shoulder slopes downward away from the impeller to a channel 15. Said channel being so designed that the perpendicular axis 15a of the wall portion 12d is directed radially outwards with reference to the rotation axis and towards the impeller in at least one portion of the notch. This configuration with the peak of the notch or shoulder 11c sloping downwards to a channel 15 is also effective in preventing migration of small particles into the seal area. The particles, including small ones, will be carried by the channel 15 and follow it helically out of cavity 6c towards the impeller where the particles will be expelled through the slot between the impeller and seal housing 5.

In summary, with reference to FIGS. 5 and 6, the cavity is designed with an increasing area in the direction of the pump impeller 3, and the wall surface is provided with a notch or a shoulder 11 which goes along the surface in an essentially spiral or helix pattern. The particles that have entered the cavity 6 are transported by the boundary layer flow towards the bottom of the cavity as shown in FIG. 2. When the particles hit the notch or shoulder 11 they are forced by the boundary layer flows to move radially inwards to try to pass the notch or shoulder. By a designing of the notch or shoulder bottom at a desired acute angle, said transport is prevented by centrifugal force. The particles will instead be carried to the pump impeller 3 where the centrifugal force will bring them away through the slot between pump impeller and seal housing. The notch or shoulder may have various inclinations and profiles to the bottom and even several notches are possible within the scope of the invention.

The embodiments of the invention shown in FIGS. 5 and 6 are effective in moving pollutants away from the seals and out of the seal cavity even when the amount of pollutants is extremely high.

The description of the cavity is described and shown with an increasing area toward the pump impeller because it is preferred for manufacturing reasons. The configurations shown and described will also be applicable to a cylindrically formed cavity or for a cavity that has a decreasing area towards the pump impeller.

While I have described my invention in connection with specific embodiments thereof, it is to be clearly understood that this is done only by way of example and not as a limitation to the scope of the invention as set forth in the appended claims.

I claim:

1. A device at a seal housing for a rotary machine such as a pump for liquids, which comprises:

a driving motor;

a hydraulic part with rotary propelling means connected to said motor via a shaft which defines a rotational axis;

a seal housing between said motor and said hydraulic part, said housing containing at least one mechanical face seal arranged within a cavity in said seal housing, said cavity defined by an annular wall with at least one internal helical groove opening axially towards said propelling means; and a slot between said rotary propelling means and said cavity, wherein said at least one internal helical groove downwardly winds in a rotational direction toward said propelling means and includes at least one substantially planar wall portion, the perpendicular axis of which is directed radially outward with reference to said rotational axis and toward the impeller; whereby said helical groove carries particles by centrifugal force out of said cavity toward said propelling means and through said slot.

2. A device according to claim 1 wherein a transition is formed where the groove and the wall surface merge, said transition defining an acute angle, wherein said particles are prevented from moving radially inwards.

3. A device according to claim 1 wherein said cavity has an increasing area in the direction of the propelling means.

4. An improved seal housing for a pump which comprises:

a driving motor;

a hydraulic part with a rotary impeller connected to the motor by a shaft which defines a rotational axis;

a seal housing located between the motor and the hydraulic part, the housing containing a cavity adjacent the impeller, within said cavity and around the shaft is a mechanical seal having a stationary sealing element, a rotary, sealing element, and a compression spring urging the stationary and rotary elements into engagement, and a slot between the seal housing and the rotary impeller, wherein the improvement comprises:

said cavity having an annular wall with an internal helical notch, said helical notch downwardly winding in a rotational direction toward the impeller and opening axially towards said impeller in which said notch has at least one substantially planar wall portion the perpendicular axis of which is directed radially outward with reference to said rotational axis and toward the impeller; wherein said helical notch is capable of carrying particles by centrifugal force out of said cavity toward said impeller and through said slot.

5. The improved seal housing according to claim 4, wherein an acute angle is obtained between a portion of said notch and said wall surface thereby preventing said particles from moving radially inwards.

6. The improved seal housing according to claim 4, wherein said cavity has an increasing area in the direction of the rotary impeller.

7. An improved seal housing for a pump which comprises:

a driving motor;

a hydraulic part with a rotary impeller connected to the motor by a shaft which defines a rotational axis;

a seal housing located between the motor and the hydraulic part, the housing containing a cavity adjacent the impeller, within said cavity and around the shaft is a mechanical seal having a stationary sealing element, a rotary, sealing element, and a compression spring urging the elements into engagement; and a slot between the seal housing and the impeller, wherein the improvement comprises:

said cavity having an annular wall surface with an internal helical shoulder, said helical shoulder downwardly winding in a rotational direction toward the impeller, and said helical shoulder sloping toward a channel, said channel opening axially towards said impeller, said helical shoulder including at least one substantially planar wall portion the perpendicular axis of which is directed radially outward with reference to said rotational axis and toward the impeller; wherein said helical shoulder is capable of carrying particles by centrifugal force out of said cavity toward said impeller and through said slot.

8. The improved seal housing according to claim 7 wherein an acute angle is obtained between said wall portion and said wall surface thereby preventing said particles from moving radially inwards.

9. The improved seal housing according to claim 7 wherein said cavity has an increasing area in the direction of the rotary impeller.

\* \* \* \* \*